(12) United States Patent
Vidyadhara et al.

(10) Patent No.: US 9,733,721 B2
(45) Date of Patent: Aug. 15, 2017

(54) RENDERING GRAPHICS USING FRAMEBUFFER NODES WITH EVENT HANDLER MAPPING IN A BINARY SEARCH TREE

(71) Applicant: Dell Products, L.P., Round Rock, TX (US)

(72) Inventors: Sumanth Vidyadhara, Bangalore (IN); Ritvik Sharma, Tonk (IN); Guru Prasad N. Yadav, Kadapa (IN)

(73) Assignee: Dell Products, L.P., Round Rock, TX (US)

( * ) Notice: Subject to any disclaimer, the term of this patent is extended or adjusted under 35 U.S.C. 154(b) by 235 days.

(21) Appl. No.: 14/698,145

(22) Filed: Apr. 28, 2015

(65) Prior Publication Data

US 2016/0321778 A1    Nov. 3, 2016

(51) Int. Cl.
*G09G 5/377* (2006.01)
*G06F 3/02* (2006.01)
*G06F 3/0354* (2013.01)
*G06F 17/30* (2006.01)

(52) U.S. Cl.
CPC ............ *G06F 3/02* (2013.01); *G06F 3/03543* (2013.01); *G06F 17/30961* (2013.01); *G09G 5/377* (2013.01); *G09G 2330/026* (2013.01); *G09G 2360/08* (2013.01)

(58) Field of Classification Search
CPC .................................... G09G 5/00; G06F 3/02
USPC .................................................. 345/545, 539
See application file for complete search history.

(56) References Cited

U.S. PATENT DOCUMENTS

| | | | | |
|---|---|---|---|---|
| 7,477,205 B1* | 1/2009 | de Waal | ................ | G06F 3/1431 345/1.1 |
| 8,031,937 B2 | 10/2011 | Rasmusson et al. | | |
| 8,395,631 B1* | 3/2013 | Wilt | ...................... | G06F 9/5016 345/502 |
| 2008/0030504 A1* | 2/2008 | Brunner | .................. | G06T 13/00 345/473 |
| 2009/0016603 A1* | 1/2009 | Rossato | ................... | G06T 7/194 382/173 |
| 2010/0060653 A1* | 3/2010 | Courtney, Jr. | ........... | G09G 5/18 345/530 |
| 2013/0120388 A1* | 5/2013 | O'Donnell | ............ | G06T 15/005 345/428 |
| 2014/0139541 A1* | 5/2014 | Willaert | ................... | G09G 5/02 345/589 |
| 2014/0184606 A1 | 7/2014 | de Richebourg et al. | | |

\* cited by examiner

*Primary Examiner* — Jacinta M Crawford
*Assistant Examiner* — Jonathan M Cofino
(74) *Attorney, Agent, or Firm* — Fogarty LLP

(57) ABSTRACT

Systems and methods for rendering graphics using framebuffer nodes. In an illustrative, non-limiting embodiment, an Information Handling System (IHS) may include a processor and a memory coupled to the processor, the memory having program instructions stored thereon that, upon execution by the processor, cause the IHS to: provide a graphical user interface (GUI) to a user via a display coupled to the IHS, where a portion of the display is rendered using a first framebuffer, detect a user' action corresponding to an event handler, retrieve, using a red-black tree, a second framebuffer associated with the event handler, and render the portion of the display using the second framebuffer.

17 Claims, 3 Drawing Sheets

RENDERING GRAPHICS USING FRAMEBUFFER NODES WITH EVENT HANDLER MAPPING IN A BINARY SEARCH TREE

FIELD

This disclosure relates generally to computer systems, and more specifically, to systems and methods for rendering graphics using framebuffer nodes with event handler mapping in a binary search tree.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and/or networking systems.

In the context of IHSs, a "framebuffer" is a portion of memory containing a bitmap of frame data, which is then driven to a video display. The information in the memory typically includes color values for each pixel on the display. These color values may be commonly stored in a number of formats, such as, for example, 1-bit binary (monochrome), 4-bit palettized, 8-bit palettized, 16-bit high color, or 24-bit true color formats. In some implementations, an additional data bits may be used to retain information about pixel transparency or the like.

SUMMARY

Embodiments of systems and methods for rendering graphics using framebuffer nodes with event handler mapping in a binary search tree are described herein. In an illustrative, non-limiting embodiment, an Information Handling System (IHS) may include a processor; and a memory coupled to the processor, the memory having program instructions stored thereon that, upon execution by the processor, cause the IHS to: provide a graphical user interface (GUI) to a user via a display coupled to the IHS, wherein a portion of the display is rendered using a first framebuffer; detect a user' action corresponding to an event handler; retrieve, using a red-black tree, a second framebuffer associated with the event handler; and render the portion of the display using the second framebuffer.

The GUI may include a Basic Input/Output System (BIOS) GUI, a Unified Extensible Firmware Interface (UEFI) firmware GUI, or a Baseboard Management Controller (BMC) GUI. In some cases, the GUI may be provided to the user in a pre-boot environment. The user's action may include a mouse or keyboard input or selection.

Each node in the red-black tree may include a framebuffer indexed by a respective event handler, and wherein the second framebuffer may be indexed by the event handler. Pixel values for each given pixel in the second framebuffer may be calculated relative to pixel values for corresponding pixels stored in the first framebuffer.

The first framebuffer may include a first set of foreground pixel values and a first set of background pixel values, wherein the second framebuffer may include a second set of foreground pixel values and a second set of background pixel values, and wherein the portion of the display may be rendered using a combination of foreground and background pixels for each given framebuffer. The second set of foreground pixels may be different from the first set of foreground pixels, the second set of background pixels may be the same as the first set of background pixels, and rendering the portion of the display using the second framebuffer may include updating foreground pixels within the portion of the display without updating any background pixels.

The program instructions, upon execution by the processor, may further cause the IHS to retrieve, using the red-black tree, a third framebuffer associated with the event handler, where the third framebuffer is at a node adjacent to the second framebuffer in the red-black tree; and render the portion of the display using the third framebuffer in the absence of further action by the user.

In another illustrative, non-limiting embodiment, in an IHS having a processor and a memory coupled to the processor, the memory having program instructions stored thereon that, upon execution by the processor, configure the IHS to provide a framebuffer graphics rendering architecture in a pre-boot environment, a method may include providing a GUI to a user via a display coupled to the IHS, wherein a portion of the display is rendered using a first framebuffer; detecting a user' action corresponding to an event handler; retrieving, using a red-black tree, a second framebuffer associated with the event handler; and rendering the portion of the display using the second framebuffer.

In yet another illustrative, non-limiting embodiment, a memory device may have program instructions stored thereon that, upon execution by a processor of an IHS in a pre-boot environment, cause the IHS to provide a GUI to a user via a display coupled to the IHS, wherein a portion of the display is rendered using a first framebuffer; detect a user' action corresponding to an event handler; retrieve, using a red-black tree, a second framebuffer associated with the event handler; and render the portion of the display using the second framebuffer.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
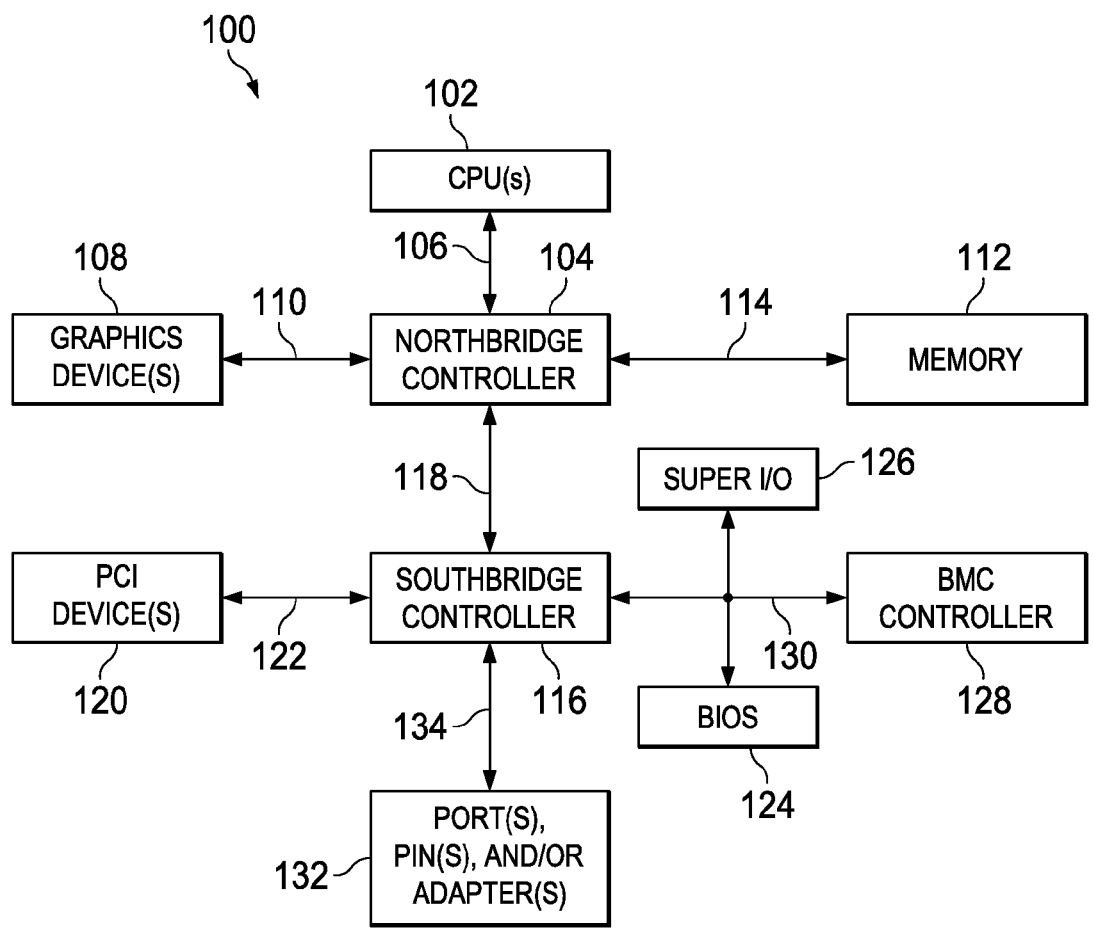
FIG. 1 is a block diagram illustrating an example of an Information Handling System (IHS) configured to render graphics using framebuffer nodes with event handler mapping in a binary search tree according to some embodiments.

Systems and methods for rendering graphics using framebuffer nodes with event handler mapping in a binary search tree are described herein. In some embodiments, an Information Handling System (IHS) may implement one or more framebuffer techniques, for example, as part of a graphical user interface (GUI) presented to a human user.

In the context of IHSs, a "framebuffer" is a portion of memory containing a bitmap of frame data, which is then driven to a video display. The information stored in the memory typically includes color values for each pixel on the display.

In a framebuffer rendering system, graphical operations are represented in a scene tree, which is a structure that arranges the logical and spatial representation of a scene. That is, a scene is represented as a collection of nodes in a tree structure, where each node of the tree is or corresponds to a framebuffer. Broadly speaking, scene trees may be used by an IHS to determine what visual content to display to a user via a GUI. In order to build the scene graph, scenes are first converted into their constituent framebuffers.

A problem with conventional framebuffer rendering technology is that the conversion of images to framebuffers can take several iterations and is not sufficiently fast. Moreover, although optimizations in image format retrieval mechanisms may exist, there are no known techniques for retrieving framebuffers based on UI events, for example. And this in turn limits the use of framebuffers by UIs that support user interactions. Accordingly, to address these, and other problems, systems and methods described herein enable the rendering of graphics using framebuffer nodes with event handler mapping in a binary search tree.

In the following detailed description of embodiments of the disclosure, specific embodiments in which the disclosure may be practiced are described in sufficient detail a person of ordinary skill in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments," or "one or more embodiments" are intended to indicate that a particular feature, structure, component, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

FIG. 1 is a block diagram illustrating an example of an IHS configured to render graphics using framebuffer nodes with event handler mapping in a binary search tree according to some embodiments. As shown, IHS 100 includes one or more CPUs 102. In various embodiments, IHS 100 may be a single-processor system including one CPU 102, or a multi-processor system including two or more CPUs 102 (e.g., two, four, eight, or any other suitable number). CPU(s) 102 may include any processor capable of executing program instructions. For example, in various embodiments, CPU(s) 102 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA. In an embodiment, a motherboard configured to provide structural support, power, and electrical connectivity between the various aforementioned components. Such a motherboard may include multiple connector sockets in various configurations, adapted to receive pluggable circuit cards, component chip packages, etc.

CPU(s) 102 are coupled to northbridge controller or chipset 104 via front-side bus 106. Northbridge controller 104 may be configured to coordinate I/O traffic between CPU(s) 102 and other components. For example, in this particular implementation, northbridge controller 104 is coupled to graphics device(s) 108 (e.g., one or more video cards, controllers, or adaptors, etc.) via graphics bus 110 (e.g., an Accelerated Graphics Port or AGP bus, a Peripheral Component Interconnect or PCI bus, etc.). Northbridge controller 104 is also coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory.

As discussed in more detail below, memory 112 may be configured to store one or more framebuffers indexed by event handlers as nodes in a binary search tree.

Northbridge controller 104 is coupled to southbridge controller or chipset 116 via internal bus 118. Generally, southbridge controller 116 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHSs attached to a network. In various embodiments, southbridge controller 116 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 116 may also enable connection to one or more keyboards, keypads, touch screens, scanning devices, voice or optical recognition devices, or any other device suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 is further coupled to one or more PCI devices 120 (e.g., network cards, sound cards, video cards, etc.) via PCI bus 132. Southbridge controller 116 is also coupled to Basic Input/Output System (BIOS) or Unified Extensible Firmware Interface (UEFI) firmware 124, Super I/O Controller 126, and Baseband Management Controller (BMC) 128 via Low Pin Count (LPC) bus 110.

BIOS/UEFI 124 includes non-volatile memory having program instructions stored thereon. Those instructions may be usable CPU(s) 102 to initialize and test other hardware components and/or to load an Operating System (OS) onto IHS 100. As such, BIOS/UEFI 124 may include a firmware interface that allows CPU(s) 102 to load and execute certain operations.

BMC controller 128 may include non-volatile memory having program instructions stored thereon that are usable by CPU(s) 102 to enable remote management of IHS 100. For example, BMC controller 128 may enable a user to discover, configure, and manage BMC controller 128, setup configuration options, resolve and administer hardware or software problems, etc. Additionally or alternatively, BMC controller 128 may include one or more firmware volumes, each volume having one or more firmware files used by the BIOS/UEFI's interface to initialize and test components of IHS 100.

In many implementations, BIOS/UEFI 124 and/or BMC controller 128 may operate prior to the booting of the OS (e.g., in response to a power-up or reset command), and may provide a pre-boot GUI to enable interactions between the user and IHS 100 before the OS is executed. The graphical portion of the pre-boot interface may be stored in a memory buffer, for example, within memory 112, in the form of framebuffer nodes of a binary search tree. These framebuffers may be rendered by graphics device(s) 108. As described in connection with FIGS. 2 and 3, each node of the search tree may be indexed by event handlers or the like.

Super I/O Controller 126 combines interfaces for a variety of lower bandwidth or low data rate devices. Those devices may include, for example, floppy disks, parallel ports, keyboard and mouse, temperature sensor and fan speed monitoring, etc.

In some cases, IHS 100 may be configured to access different types of computer-accessible media separate from memory 112. Generally speaking, a computer-accessible memory device may include any tangible, non-transitory storage media or memory media such as electronic, magnetic, or optical media—e.g., magnetic disk, a hard drive, a CD/DVD-ROM, a Flash memory, etc.—coupled to IHS 100 via northbridge controller 104 and/or southbridge controller 116.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of physical storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following an Intel® architecture, various systems and methods described herein may be adapted to work with any other chipset and/or BMC configuration.

In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 104 may be combined with southbridge controller 116, and/or be at least partially incorporated into CPU(s) 102. In other implementations, one or more of the devices or components shown in FIG. 1 may be absent, or one or more other components may be added. Accordingly, systems and methods described herein may be implemented or executed with other computer system configurations. In some cases, various elements shown in FIG. 1 may be enclosed within a chassis or the like.

A person of ordinary skill in the art will recognize that IHS 100 of FIG. 1 is only an example of a system in which the present embodiments may be utilized. Indeed, the present embodiments may be used in various other types of electronic devices.

Figure 2:
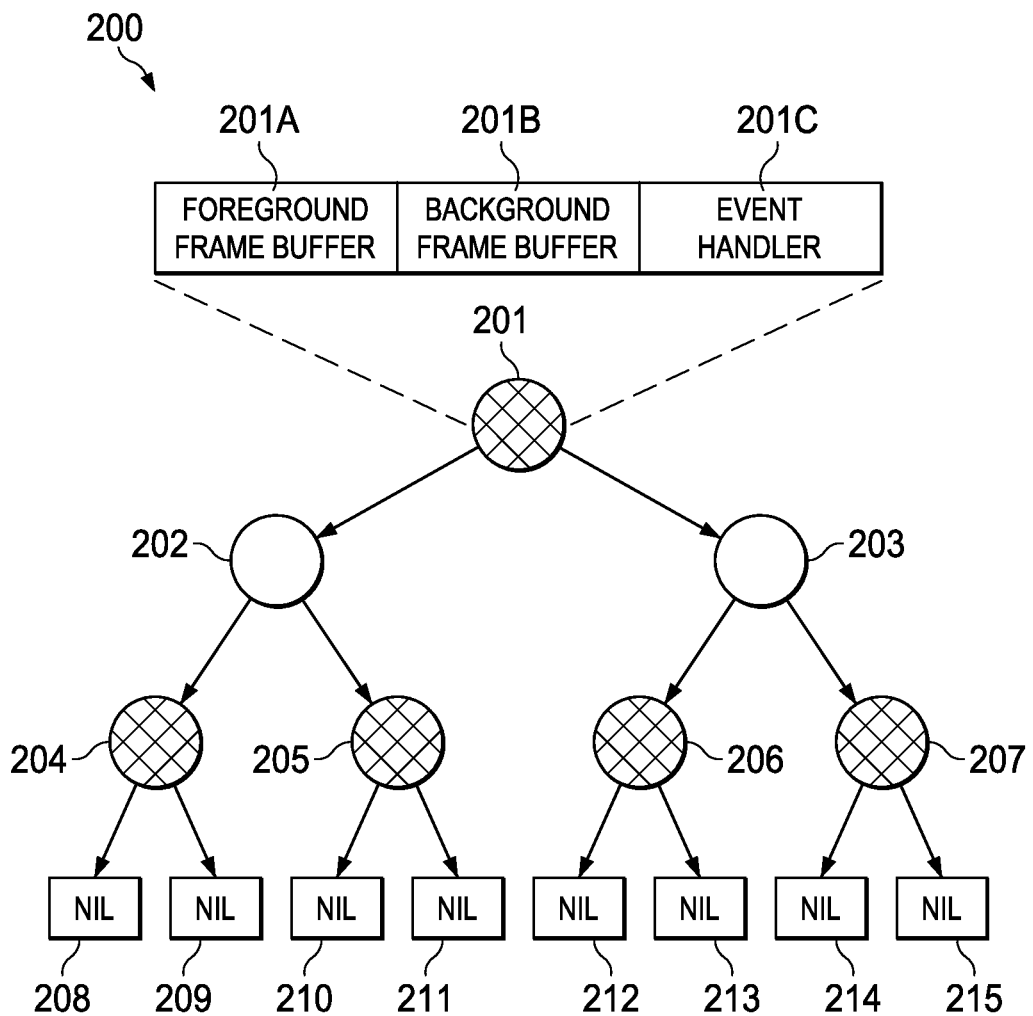
FIG. 2 is a block diagram of an example of a red-black tree according to some embodiments.

FIG. 2 is a block diagram of an example of red-black tree 200 according to some embodiments. The term "red-black tree," as used herein, refers to a binary search tree with an extra bit of data per node, its color, which can be either "red" or "black." The extra bit of storage ensures an approximately balanced tree by constraining how nodes are colored from any path from the root (i.e., node 201) to the leaves (i.e., NIL 208-215). Thus, a red-black tree is referred to as a self-balancing binary search tree.

Particularly, balance is preserved by painting each node of the tree in a way that satisfies certain properties, which collectively constrain how unbalanced the tree can become in the worst search case. When tree 200 is modified, the new tree is subsequently rearranged and repainted to restore the original coloring properties. These properties are designed in such a way that this rearranging and recoloring can be performed efficiently.

Importantly, balancing of the tree, even when not perfect, allows it to guarantee searching in O(log n) time, where n is the total number of elements in the tree. The insertion and deletion operations, along with the tree rearrangement and recoloring, are also performed in O(log n) time. Moreover, tracking the color of each node requires only 1 bit of information per node because there are only two colors. The tree need not contain any other data specific to its being a red-black tree, so its memory footprint is almost identical to a classic (uncolored) binary search tree. In many cases, the additional bit of information can be stored at little to no additional memory cost.

Nodes 201-207 of red-black tree 200 may each contain or refer to a framebuffer indexed by a corresponding event handler. In this example, nodes 201 and 204-207 are labeled "black" whereas nodes 202 and 203 are labeled "red." Each node or framebuffer within red-black tree 200 includes foreground pixel data 201A separate from background pixel data 201B and indexed by event handler 201C.

Generally, upon detection of an event corresponding to event handler 201C, foreground pixel data 201A may be combined with background pixel data 201B to render a portion of a GUI to a user (e.g., a virtual button, selection box, text field, command line, window, etc.). And, in cases where the background data does not change due to the event, only foreground pixel data is updated on the display.

Figure 3:
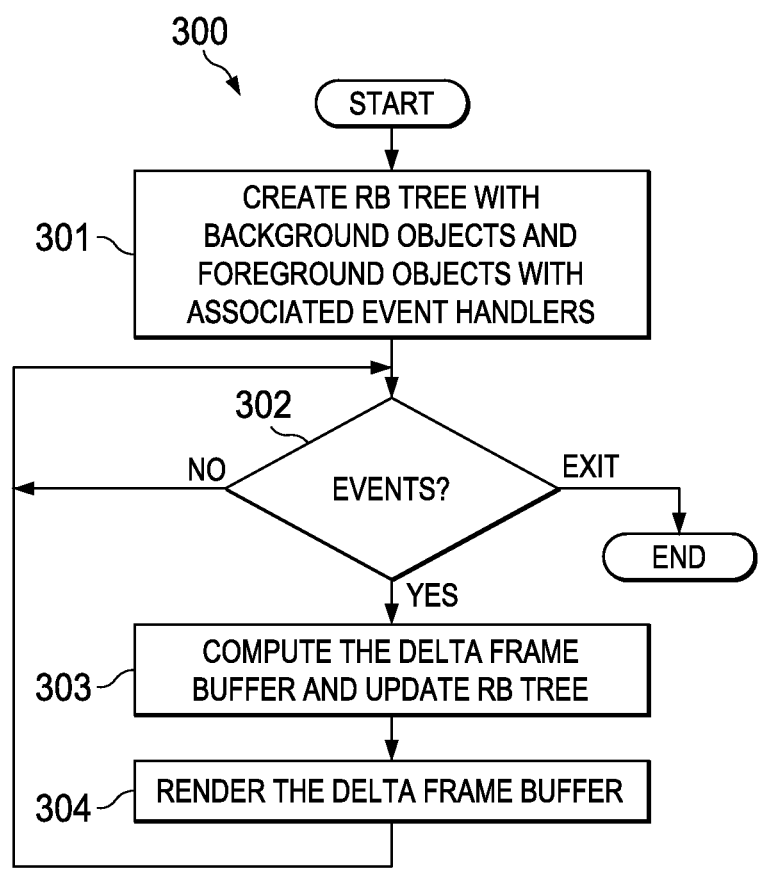
FIG. 3. is a flowchart of an example of a method for rendering graphics using framebuffer nodes with event handler mapping according to some embodiments.

FIG. 3. is a flowchart of an example of method 300 for rendering graphics using framebuffer nodes with event handler mapping according to some embodiments. Broadly speaking, UI actions may each require an event handler and, based on the generated events, a new set of images are displayed on the UI. These images may be converted to framebuffers with pixel mapping to be displayed on the video controller.

As previously noted, a framebuffer may include a combination of background and foreground objects. In some implementations, background objects/shapes/textures are assumed to be unchanging, and only the foreground objects/shapes/textures are stored in tree 200. In other implementations, a framebuffer for an image to be displayed is formed by combination of these foreground and background objects. Further, each framebuffer is associated with its corresponding event handler and stored in red-black tree 200 for faster retrieval.

In some cases, events may be associated with corresponding "delta" framebuffers that include only differential changes between sequential images. For example, when an UI button is pressed, a corresponding event handler may trigger the following actions: (1) a framebuffer associated with the action item of the button may be populated and the rest of the framebuffer retained; (2) retrieval of a Delta area changed in the framebuffer and the associated events are stored in a red-black tree 200, so that the retrieval of these framebuffer is occurs with a constant time of O (log n) complexity; and (3) based on button press in the UI area, the corresponding event handler may be triggered and the "delta" image objects may be retrieved and displayed on framebuffer at a faster rate.

Turning back to FIG. 3, method 300 starts and, at block 301, creates red-black tree 200 with background objects, foreground objects, and associated event handlers. Still at block 301, method 300 may include providing a GUI using a first framebuffer stored as node (e.g., node 201) of red-black tree 200. At block 302, method 300 includes waiting for an action by the user (e.g., a mouse click in a selected portion of the GUI). If the user exits the GUI, method 300 ends. Otherwise, when an event is detected, control passes to block 303. At block 303, method 300 computes the delta framebuffer and updates red-black tree 200 with any changes due to the event. Then, at block 304, method 300 renders the delta framebuffer.

As such, method 300 may include providing a GUI using a first framebuffer stored as node (e.g., node 201) of red-black tree 200, detecting an action by the user (e.g., a mouse click in a selected portion of the GUI), and identifying an event handler associated with that action. Method 300 then retrieves a second framebuffer from red-black tree 200 (e.g., node 202) associated with the event handler and renders the portion of the GUI using the second framebuffer.

In some implementations, method 300 may operate upon the foreground pixel group only; as most of the time the background scene in a framebuffer remains same. Framebuffers which only depict the changes required for the pixels are stored in the red-black tree 200 and are mapped to events. The events know the framebuffer sequence to be fetched for rendering on video controller based upon the structure of the tree. Also, method 300 requires less computation time because framebuffers are pre-determined and stored in the tree, so it takes less time to compute the basic scene to be displayed.

In contrast with other approaches, where entire framebuffers are created after an event is detected, method 300 requires only that delta framebuffers (which also have associated event handlers) be computed after the event, which results in much faster rendering and processing times.

For example, during operation of GUI by a user switching from a window to a subsequent window, only the delta framebuffer(s) for the subsequent window need to be computed and then rendered on the screen. All initial scene framebuffers may be available an retrievable directly from red-black tree 200, thus saving time. Moreover, all changes in the framebuffers after the initial loading may be optimized via selective updates of foreground objects based on event handlers associated with those framebuffers.

* * *

In the above described flowcharts, one or more of the methods may be embodied in a memory device or computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by a person of ordinary skill in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable a person of ordinary skill in the art to understand the disclosure for various embodiments with various modifications as are suited to the particular use contemplated.

The invention claimed is:

1. An Information Handling System (IHS), comprising:
a processor; and
a memory coupled to the processor, the memory having program instructions stored thereon that, upon execution by the processor, cause the IHS to:
provide a graphical user interface (GUI) to a user via a display coupled to the IHS, wherein a portion of the display is rendered using a first framebuffer;
detect an action performed by the user, the action corresponding to an event handler;
retrieve, using a red-black tree, a second framebuffer associated with the event handler;
render the portion of the display using the second framebuffer;
retrieve, using the red-black tree, a third framebuffer associated with the event handler, wherein the third framebuffer is at a node adjacent to the second framebuffer in the red-black tree; and
render the portion of the display using the third framebuffer in the absence of further action by the user.

2. The IHS of claim 1, wherein the GUI includes a Basic Input/Output System (BIOS) GUI, a Unified Extensible Firmware Interface (UEFI) firmware GUI, or a Baseboard Management Controller (BMC) GUI.

3. The IHS of claim 2, wherein the GUI is provided to the user in a pre-boot environment.

4. The IHS of claim 1, wherein the user's action includes a mouse or keyboard input or selection.

5. The IHS of claim 1, wherein each node in the red-black tree includes a framebuffer indexed by a respective event handler, and wherein the second framebuffer is indexed by the event handler.

6. The IHS of claim 1, wherein pixel values for each given pixel in the second framebuffer are calculated relative to pixel values for corresponding pixels stored in the first framebuffer.

7. The IHS of claim 1, wherein the first framebuffer includes a first set of foreground pixel values and a first set of background pixel values, wherein the second framebuffer includes a second set of foreground pixel values and a second set of background pixel values, and wherein the portion of the display is rendered using a combination of foreground and background pixels for each given framebuffer.

8. The IHS of claim 7, wherein the second set of foreground pixels is different from the first set of foreground pixels, wherein the second set of background pixels is the same as the first set of background pixels, and wherein rendering the portion of the display using the second framebuffer includes updating foreground pixels within the portion of the display without updating any background pixels.

9. In an Information Handling System (IHS) having a processor and a memory coupled to the processor, the memory having program instructions stored thereon that, upon execution by the processor, configure the IHS to provide a framebuffer graphics rendering architecture in a pre-boot environment, a method comprising:
providing a graphical user interface (GUI) to a user via a display coupled to the IHS, wherein a portion of the display is rendered using a first framebuffer;
detecting an action performed by the user, the action corresponding to an event handler;
retrieving, using a red-black tree, a second framebuffer associated with the event handler;
rendering the portion of the display using the second framebuffer;

retrieving, using the red-black tree, a third framebuffer associated with the event handler, wherein the third framebuffer is at a node adjacent to the second framebuffer in the red-black tree; and rendering the portion of the display using the third framebuffer in the absence of further action by the user.

10. The method of claim 9, wherein the GUI includes a Basic Input/Output System (BIOS) GUI, a Unified Extensible Firmware Interface (UEFI) firmware GUI, or a Baseboard Management Controller (BMC) GUI, and wherein the GUI is provided to the user in a pre-boot environment.

11. The method of claim 9, wherein pixel values for each given pixel in the second framebuffer are calculated relative to pixel values for corresponding pixels stored in the first framebuffer.

12. The method of claim 9, wherein the first framebuffer includes a first set of foreground pixel values and a first set of background pixel values, wherein the second framebuffer includes a second set of foreground pixel values and a second set of background pixel values, and wherein the portion of the display is rendered using a combination of foreground and background pixels for each given framebuffer.

13. The method of claim 12, wherein the second set of foreground pixels is different from the first set of foreground pixels, wherein the second set of background pixels is the same as the first set of background pixels, and wherein rendering the portion of the display using the second framebuffer includes updating foreground pixels within the portion of the display without updating any background pixels.

14. A memory device having program instructions stored thereon that, upon execution by a processor of an Information Handling System (IHS) in a pre-boot environment, cause the IHS to:

provide a graphical user interface (GUI) to a user via a display coupled to the IHS, wherein a portion of the display is rendered using a first framebuffer;

detect an action performed by the user, the action corresponding to an event handler;

retrieve, using a red-black tree, a second framebuffer associated with the event handler;

render the portion of the display using the second framebuffer;

retrieve, using the red-black tree, a third framebuffer associated with the event handler, wherein the third framebuffer is at a node adjacent to the second framebuffer in the red-black tree; and render the portion of the display using the third framebuffer in the absence of further action by the user.

15. The memory device of claim 14, wherein pixel values for each given pixel in the second framebuffer are calculated relative to pixel values for corresponding pixels stored in the first framebuffer.

16. The memory device of claim 14, wherein the first framebuffer includes a first set of foreground pixel values and a first set of background pixel values, wherein the second framebuffer includes a second set of foreground pixel values and a second set of background pixel values, and wherein the portion of the display is rendered using a combination of foreground and background pixels for each given framebuffer.

17. The memory device of claim 14, wherein the second set of foreground pixels is different from the first set of foreground pixels, wherein the second set of background pixels is the same as the first set of background pixels, and wherein rendering the portion of the display using the second framebuffer includes updating foreground pixels within the portion of the display without updating any background pixels.

* * * * *